J. G. SCHIFFER.
Taps and Faucets for Beer-Casks.
No. 150,716. Patented May 12, 1874.
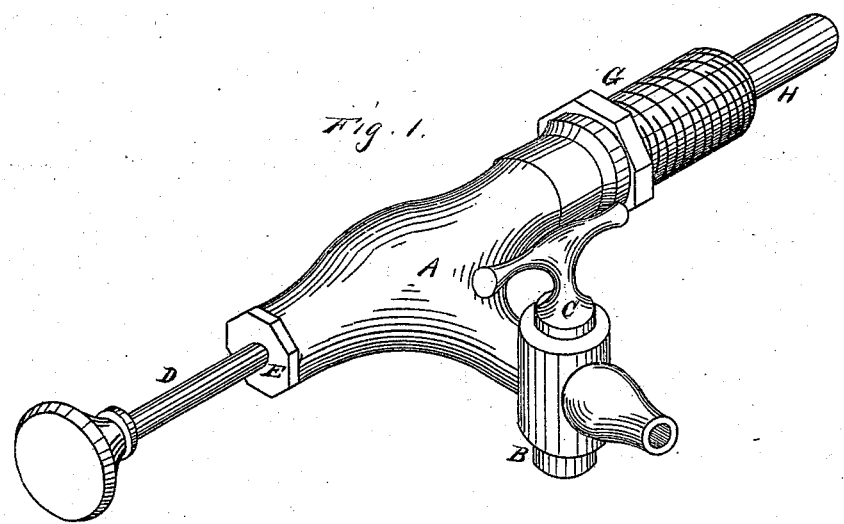
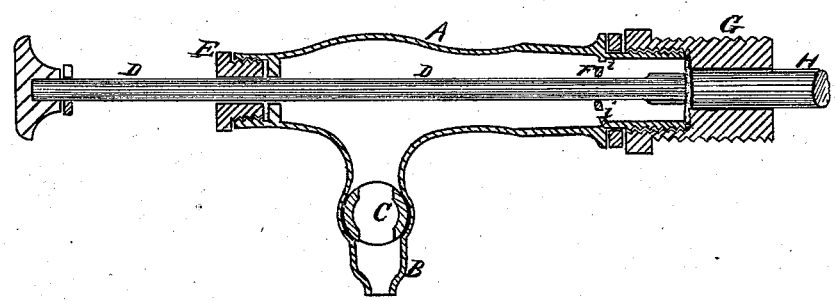

UNITED STATES PATENT OFFICE.

JOHN G. SCHIFFER, OF SAN FRANCISCO, CALIFORNIA.

IMPROVEMENT IN TAPS AND FAUCETS FOR BEER-CASKS.

Specification forming part of Letters Patent No. 150,716, dated May 12, 1874; application filed September 13, 1873.

*To all whom it may concern:*

Be it known that I, JOHN G. SCHIFFER, of San Francisco city and county, State of California, have invented a Tap and Faucet for Beer-Casks; and I do hereby declare the following description and accompanying drawings are sufficient to enable any person skilled in the art or science to which it most nearly appertains to make and use my said invention without further invention or experiment.

My invention relates to a novel device for making the connection between the interior of a beer-cask and the faucet from which its contents are to be drawn; and it consists in the use of a plunger or rod which passes through the faucet, being packed so as not to leak.

The socket into which the faucet screws is screwed tightly into the barrel, and its central opening is stopped by a plug. After the faucet is screwed down to its seat, a blow upon the sliding rod or plunger forces it against the plug, thus driving it into the barrel, and leaving the connection upon the faucet.

Referring to the accompanying drawing for a more complete explanation of my invention, Figure 1 is a perspective view of my faucet. Fig. 2 is a sectional view.

A is a faucet of ordinary construction, having its discharge-nozzle B at one side of the main portion, as shown, this opening being controlled by a cock, C. A rod, D, passes longitudinally through the faucet, being kept tight by means of a stuffing-box, E, at the outer end, as shown.

At the inner end it passes through a diaphragm, F, which has holes $i$ $i$ around this central rod, and these holes serve to admit the liquid to the interior of the faucet when connection with the interior of the cask is made. A metal socket, G, is screwed into the cask, and an interior screw serves to hold the faucet, which is screwed into it. When the cask is filled with beer or other liquid, this socket has its central opening stopped by a plug, H, driven tightly into it.

When it is to be used, the faucet is screwed into its place, and the head of the rod is struck so as to force its inner end against the plug H, and thus drive it into the cask. This allows the contained liquid to fill the faucet, in readiness to be drawn by turning the cock, and there will be no waste while making the connection with the faucet, as the whole is made tight before the plug is driven out.

Having thus described my invention, what I claim, and desire to secure by Letters Patent, is—

The faucet A with its plunger D, in combination with the socket G and plug H, when constructed to operate substantially as and for the purpose herein described.

In witness whereof I hereunto set my hand and seal.

JOHN G. SCHIFFER. [L. S.]

Witnesses:
JNO. L. BOONE,
C. MILTON RICHARDSON.